United States Patent [19]

Takeuchi et al.

[11] Patent Number: 5,193,150
[45] Date of Patent: Mar. 9, 1993

[54] DATA TRANSFER METHOD, DATA TRANSFER APPARATUS AND INFORMATION PROCESSING SYSTEM

[75] Inventors: Ikuo Takeuchi; Kohji Kamejima; Tomoyuki Hamada, all of Ibaraki; Norihisa Miyake, Matsudo, all of Japan

[73] Assignee: Hitachi, Ltd., Tokyo, Japan

[21] Appl. No.: 401,861

[22] Filed: Sep. 1, 1989

[30] Foreign Application Priority Data

Sep. 5, 1988 [JP] Japan .................. 63-221851

[51] Int. Cl.⁵ .............................. G06F 13/14
[52] U.S. Cl. ...................... 395/200; 364/DIG. 1; 364/260.1; 364/239; 364/239.3
[58] Field of Search ... 364/200 MS File, 900 MS File; 395/200, 250, 325

[56] References Cited

U.S. PATENT DOCUMENTS 4,387,433  6/1983  Cardenia et al. ............ 364/200

FOREIGN PATENT DOCUMENTS 217340  9/1987  Japan .

Primary Examiner—Michael R. Fleming
Assistant Examiner—Debra A. Chun
Attorney, Agent, or Firm—Antonelli, Terry, Stout & Kraus

[57] ABSTRACT

A data transfer apparatus, in which when significant length data having a data length longer than the capacity of a communication bus is inputted/outputted through the communication bus into/from a data storage means, a part or the whole of the data transferred through the communiction bus is temporarily stored in a transfer processor so as to combine the data to be in the form of the significant length data so that the significant length data formed by the transfer processor supplied to the data storage means.

3 Claims, 8 Drawing Sheets

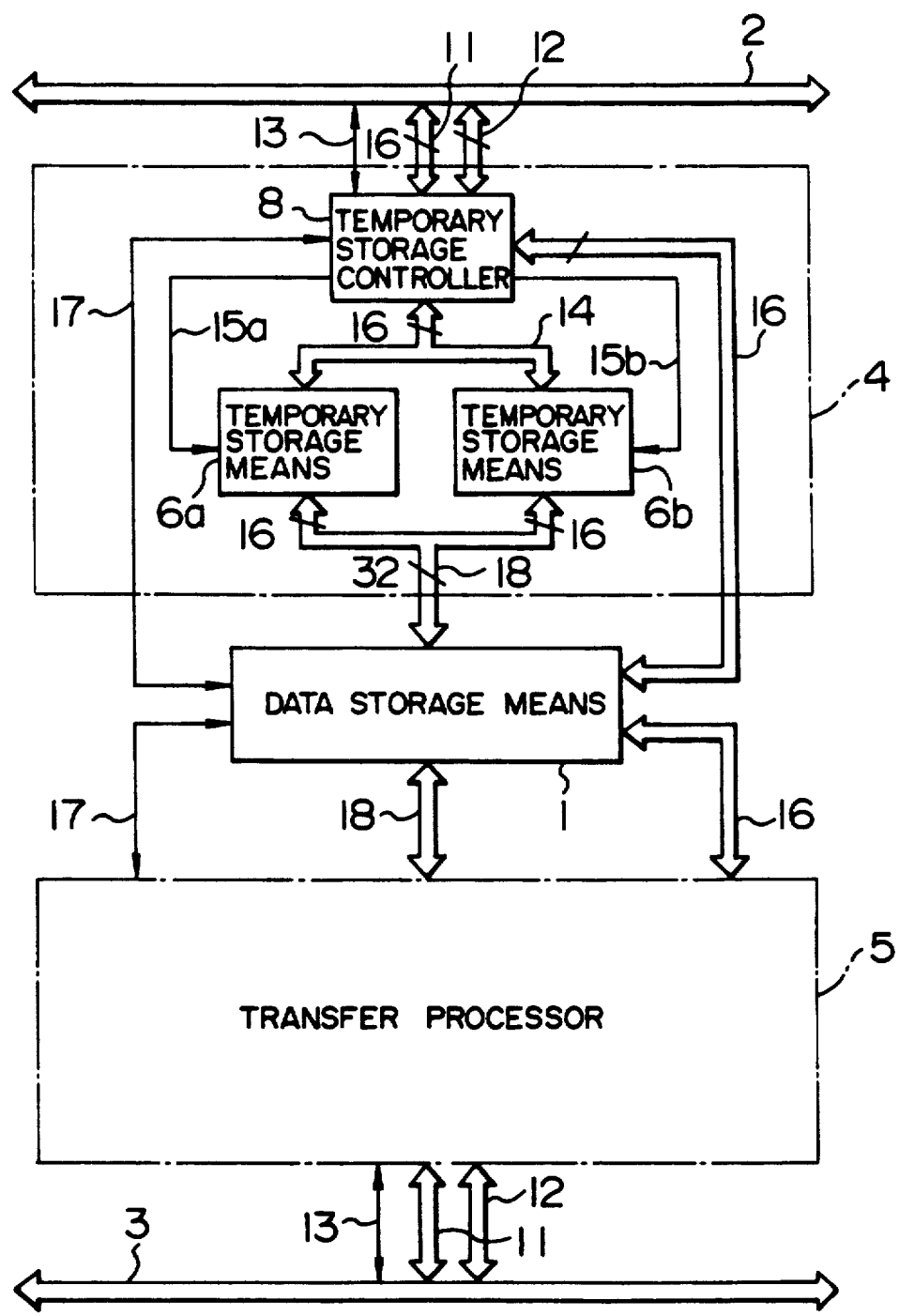

CONTROL SIGNAL

ADDRESS SIGNAL

DATA SIGNAL

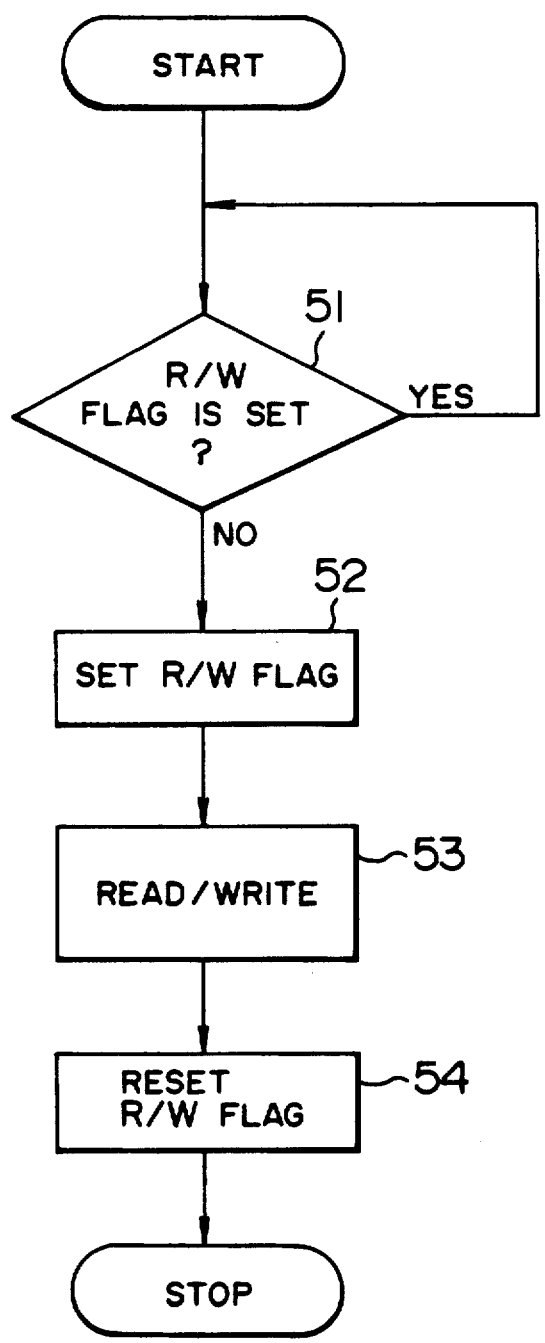

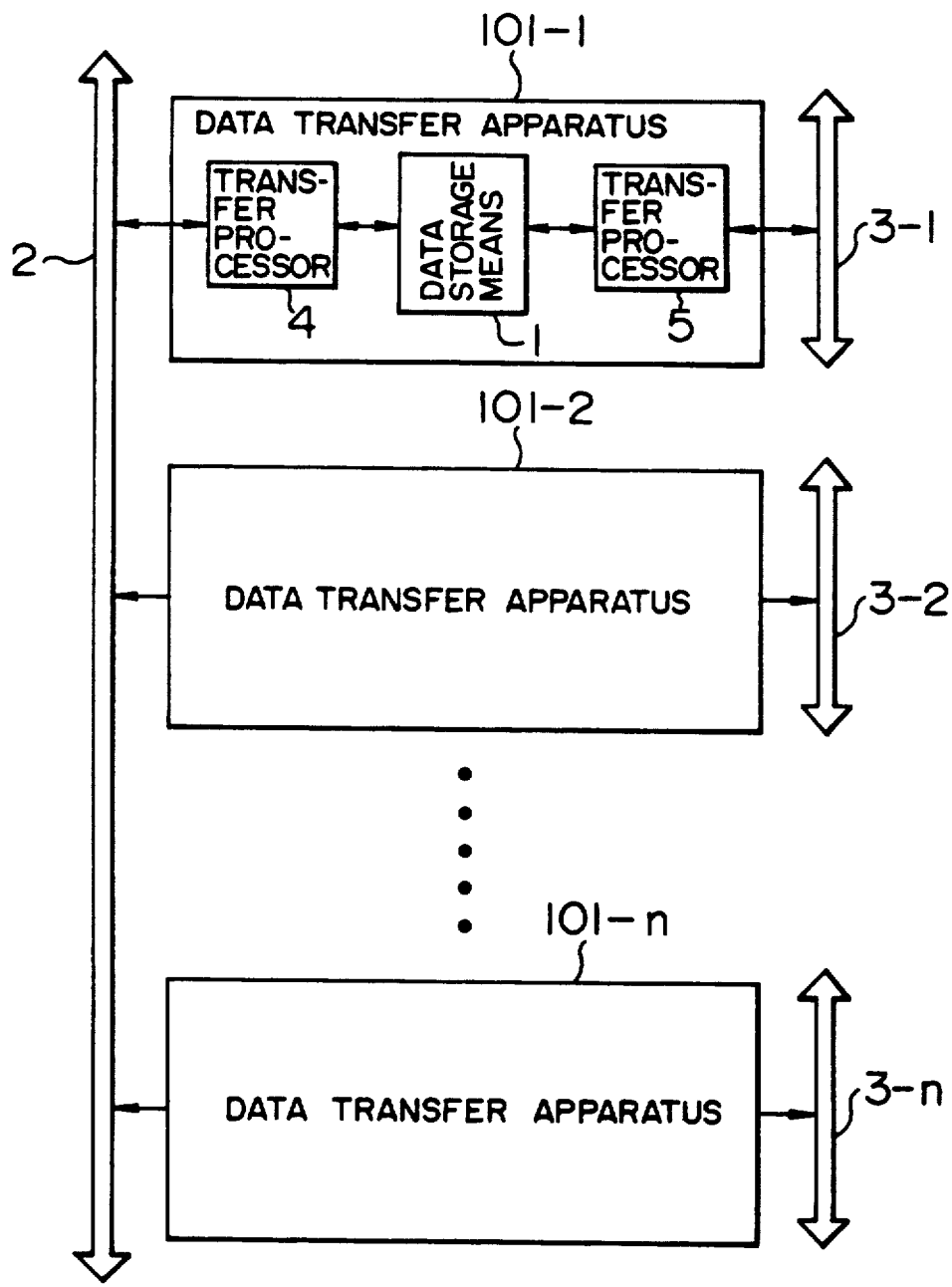

DATA TRANSFER METHOD, DATA TRANSFER APPARATUS AND INFORMATION PROCESSING SYSTEM

BACKGROUND OF THE INVENTION

1. Field of the Invention

The present invention relates to a data transfer method and a data transfer apparatus for transferring data in a parallel system through communication buses between an information processing apparatus and at least one other information processing apparatus, and further relates to an information processing apparatus provided with such a data transfer apparatus.

2. Description of Background Art

In parallel data transfer through a communication bus, there is a limit in the quantity of data, or the number of bytes of data, which can be transferred in one operation. Accordingly, in the case where data having a significant length exceeding the limit (hereinafter referred to as "significant length data"), it is impossible to transfer the data in one operation. Conventionally, therefore, the significant length data is divided into a plurality of blocks of data in accordance with the capacity of the communication bus so that the data is transferred block by block as disclosed, for example, in Japanese Patent Unexamined Publication JP-A-62-217340.

According to the conventional technique disclosed in the above Japanese Patent Unexamined Publication No. 62-217340, it is necessary to judge whether data transfer has been completed correctly or not. For example, in the case where significant length data is read out from data storage means, it is necessary that data reading be made twice with a fixed period of access to the data storage means. The data read out twice are collated whether they are coincident with each other or not to thereby check whether correct data transfer has been performed or not.

Accordingly, the conventional technique disclosed in the above Japanese Patent Unexamined Publication No. 62-217340 has a problem that it is impossible to make access to the data storage means at random or non-synchronously. If access to the data storage means is made at random or non-synchronously without performing data collating, there is a possibility that significant length data having erroneous contents may be transferred.

The conventional technique has a further problem that there is a limit in making the data transfer rate high, because it is necessary to carry out reading operation twice for the purpose of collating.

In the case where data is transferred between computer systems, conventionally, simultaneously generated access requests to data storage means are controlled by a flag. In this case, however, there is a possibility of occurrence of an erroneous operation that both one and another access request may be allowed if the other access request is generated in addition to the one current access request in a period from the point of time of confirmation of the not-set state of the flag to the point of time of setting the flag according to the one current access request.

Further, time is required to perform flag control processing so that there is a limit in making the data transfer rate high.

SUMMARY OF THE INVENTION

It is therefore an object of the present invention to solve the above noted problems in the conventional technology.

It is another object of the present invention to provide a data transfer method and apparatus in which in performing data transfer including input/output, through a communication bus, of significant length data having a data length longer than the capacity of the communication bus into/from data storage means, it is possible to correctly transfer the significant length data through random access without performing flag control and data collating.

In order to attain the above objects, according to the present invention, the data transfer is performed the a manner so that in inputting/outputting of significant length data having a data length longer than the capacity of a communication bus into/from data storage means through the communication bus can be performed. In the present invention when writing into the data storage means is performed, a part or the whole of data transferred through the communcation bus is temporarily stored so as to make the data in the form of the significant length data so that the significant length data is collectively written into the data storage means. Further in the present invention when reading from the data storage means is performed, the significant length data stored in the data storage means are collectively read out so that a part or the whole of the data are temporarily stored and then outputted onto the communication bus.

Preferably, transfer processing means is provided between the communication bus and the data storage means for transferring input/output data after temporarily storing the input/output data, the transfer processing means including temporary storage means for temporarily storing a plurality of blocks of data obtained by dividing the significant length data in accordance with the capacity of the communication bus.

Preferably, the transfer processing means is connected to the communication bus through a data bus having a capacity equal to the communication bus and connected to the data storage means through a data bus having a capacity equal to the significant length data.

Preferably, the transfer processing means is sectioned into two for performing a write operation into and for a read operation from the data storage means respectively.

BRIEF DESCRIPTION OF THE DRAWINGS

Other features and advantages of the present invention will be apparent from the following description taken in connection with the accompanying drawings, wherein:

FIG. 1 is a configuration view showing a first embodiment of the data transfer apparatus according to the present invention;

FIG. 3 is a flowchart for explaining the procedure of flag control in the conventional example in comparison with the operation of the embodiment of FIG. 1;

FIG. 10 is a view showing another embodiment of the data transfer apparatus according to the present invention.

DESCRIPTION OF THE PREFERRED EMBODIMENTS

Figure 2A:
FIGS. 2A, 2B and 2C are time charts of signals for explaining the operation of the embodiment of FIG. 1.

The present invention will be described in detail hereunder with respect to the embodiments thereof.

FIG. 1 shows the configuration of the main part of an embodiment of the data transfer apparatus according to the present invention. In this embodiment of the data transfer apparatus according to the present invention, configuration is made so that data transfer is performed through a data storage means 1 and two communication buses 2 and 3. A transfer processor 4 is inserted and connected between the data storage means 1 and the communication bus 2 and another transfer processor 5 is inserted and connected between the data storage means 1 and the communication bus 3.

The data storage means 1 is bi-directionally accessible so that data transfer can be performed bi-directionally through the transfer processors 4 and 5.

Each of the communication buses 2 and 3 may be constituted by, for example, a general-purpose multibus so that it can be connected to an information processing system such as a computer system (not shown) or the like.

Since the transfer processors 4 and 5 have the same configuration, only the transfer processor 4 will be described hereunder for the sake of simplification of description. The transfer processor 4 is constituted by two temporary storage means 6a and 6b and a temporary storage control means 8.

The communication bus 2 is connected to the temporary storage control means 8 through a data bus 11, an address bus 12 and a control line 13. The temporary storage control means 8 is connected to the temporary storage means 6a and 6b through a data bus 14 and control lines 15a and 15b, and connected to the data storage means 1 through an address bus 16 and a control line 17. The temporary storage means 6a and 6b are connected to the data storage means 1 through a data bus 18.

The capacity of the buses 11, 12, 14, 16 and 18, and the capacity and number of the temporary storage means 6a and 6b are determined in accordance with the data length of the significant length data and the data bus capacity cf the communication buses 2 and 3. Assume that the capacity of each of the communication buses 2 and 3 is 16 bits (2 bytes) and that the data length of the significant length data is 32 bits (4 bytes). In this case, the significant length data is divided into two 2-byte data blocks, and the two data blocks are transferred through the communication bus 2 or 3. Consequently, each of the temporary storage means 6a and 6b is established to have a capacity of 2 bytes. That is, the capacity of each of the temporary storage means 6a and 6b and the number of the temporary storage means 6a and 6b are determined so that all the divisional data blocks can be temporarily stored. Therefore, the capacity of each of the data buses 11 and 14 is established so as to be 16 bits. Since data are treated in the form of significant length data in the data storage means 1, the capacity of the data bus 18 is established so as to be 32 bits so that one half, 16 bits, thereof is connected to the temporary storage means 6a, and the other one half, 16 bits, thereof is connected to the temporary storage means 6b. The capacity of each of the address buses 12 and 16 is established to be 20 or 24 bits. The control lines 13 and 17, 15a and 15b are used for supplying read/write control signals or the like to the data storage means 1, and the temporary storage means 6a and 6b.

Figure 2B:
Figure 2C:

Next, the operation of the thus configured specific embodiment of FIG. 1 will be described. First, description will be made as to the case where data transferred through the communication bus 2 are to be written into the data storage means 1. A control signal, an address signal, and a data signal are transferred to the temporary storage control means 8 through the compmunication bus 2 at the timing as shown in FIG. 2. Data of one byte (8 bits) are allotted to each address signal and the temporary storage control means 8 performs control on the basis of the contents of the control signal (a write signal) so as to make access to an address area of the data storage means 1 corresponding to the address signal. Since the data transmission capacity at a time through the communication bus 2 is two bytes, significant length data of four bytes must be transmitted dividedly by two times with two bytes per each time. Therefore, the temporary storage control means 8 discriminates, when significant length data of four bytes are to be transmitted, first two bytes of the data to be transmitted at the first time from the last two bytes of the data to be transmitted at the second time and transmits the first two bytes and the last two bytes, after storing them in the temporary storage means 6a and 6b, respectively, to the data storage means 1 so that the significant length data of four bytes are reconstructed in the data storage means 1. At this time, the temporary storage control means 8 selects one of the temporary storage means 6a and 6b on the basis of the contents of the lower second bit of the address signal, and selects the address area of the data storage means 1 on the basis of the contents of those bits lower than the second bit of the same. Then, the temporary storage control means 8 causes the temporary storage means 6a to temporarily store therein a first data block sent from the communication bus 2, and then causes the temporary storage means 6b to temporarily store the next data block. Thus, upon detection of completion of all the data blocks constituting the significant length data, the tempoaty storage control means 8 obtains the right of access to the data storage means 1. Then, the temporary storage control means 8 collectively transfers the contents of the tempoaty storage means 6a and 6b to the corresponding address area of the data storage means 1 so as to cause the data storage means 1 to write the contents therein. Thereafter, the temporary storage control means 8 leaves the right of access. Further, the temporary storage means for temporarily storing the final one of the data blocks constituting the significant length data (the temporary storage means 6b in the embodiment of FIG. 1) may be a buffer only for receiving data.

Next, description will be made as to the case where data requested through the communication bus 2 are read from the data storage means 1. The same signals as those shown in FIG. 2 are transferred to the temporary storage control means 8 through the communication bus 2 also in the case of reading operation. In response to those signals, the temporary storage control means 8 obtains the right of access to the data storage means 1 and generates a read signal for reading the significant length data at the corresponding address area of the data storage means 1. The temporary storage control means 8 divides the significant length data read out in response to the read signal into a data portion corresponding to the foregoing first data block and another data portion corresponding to the remainder data block, and causes the temporary storage means 6a and 6b to temporarily store therein those divisional data portions respectively. Then, the temporary storage control means 8 leaves the right of access, and successively transfers the data blocks stored in the temporary storage means 6a and 6b to the communication bus 2.

In the case of the transfer processor 5, similarly to the above case, data transfer is performed between the communication bus 3 and the data storage means 1.

In the embodiment of FIG. 1, as described above, the transfer processors 4 and 5 are provided so that data are temporarily stored in the form of significant length data in the transfer processor 4 or 5 and then the significant length data temporarily stored in the transfer processor 4 or 5 are written into the data storage means 1 or transferred onto the communication bus 2 or 3. Therefore, data transfer can be correctly performed without performing transfer data collating so that the rate of transfer processing can be made high. Further, it is not necessary to synchronize the access period between information processors relating to the data transfer so that it is possible to make random access.

Moreover, in the case of making write/read access to the data storage means 1, since it is not necessary to pay regard to existence of access to the other side information processor, each of the information processors can make accesses to the data storage means 1 at desired timing. As a result, it becomes unnecessary to perform flag control, so that mal-operation due to flag control can be prevented from occurring and the rate of operation can be made higher correspondingly to saving of the time which is to be taken for the flag control processing.

Figure 4:
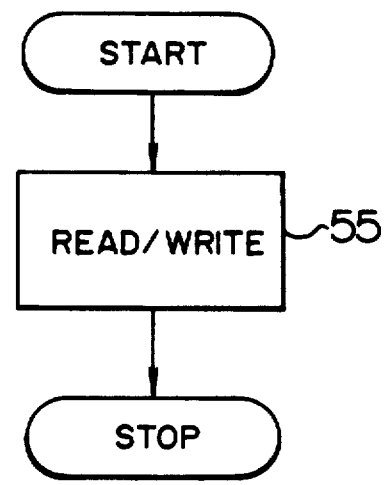
FIG. 4 is a flowchart for explaining the data transfer processing of the embodiment of FIG. 1.

In order to make a comparison, FIG. 3 shows the flowchart for data transfer under flag control and FIG. 4 shows the flowchart for data transfer according to the embodiment of FIG. 1. In the case of data transfer under flag control, a read/write flag (an R/W flag) is checked in the step 51, and if the judgment proves that the flag is not set (NO), the flag is set in the step 52 to thereby inhibit access from the other side. After read/write has been executed in the step 53, the R/W flag is reset in the step 54 to therby permit making an access from the other side. Here, if access is requested from the other side before the R/W flag has been set in the step 52 when the judgement gives NO in the step 51, there is a possibility that an answer "NO" is given to the access request from the other side so that both the information processors access to the one and the same data storage means. In this case, if the respective access requests from both the information processors are to perform read operation, no special problem is caused. If at least one of the access requests is to perform write operation, however, there is a possibility that erroneous data transfer is generated. In the data transfer means according to this embodiment, on the contrary, it is not necessary to pay regard onto access from the other side as shown in FIG. 4.

Although description has been made as to the case where the significant length data are divided into two data blocks in the embodiment of FIG. 1, it will do to select the number of the temporary storage means 6a, 6b, . . . to be N (an integer) if the present invention is applied to significant length data constituted by N data blocks.

Figure 5:
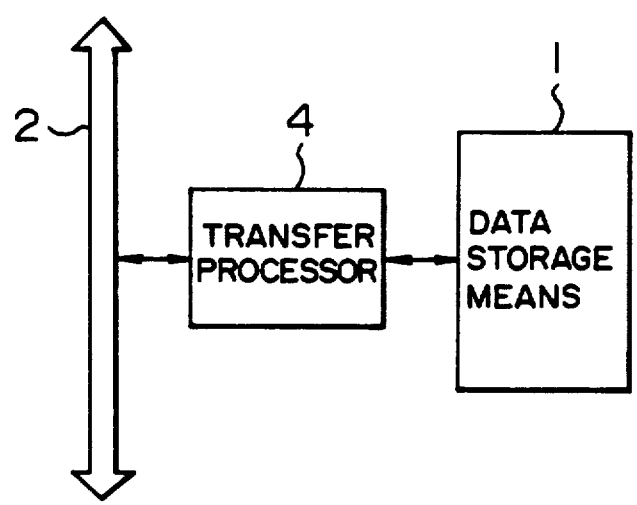
FIGS. 5, 6 and 7 are configuration views showing other embodiments of the data transfer apparatus according to the present invention respectively.

FIG. 5 shows another embodiment of the present invention. In this embodiment, the present invention is applied to the data transfer apparatus in which data transfer is performed through one communication bus 2 so that access is made one-directionally to the data storage means 1. The operation of this embodiment is the same as that described above concerning the embodiment of FIG. 1, and therefore explanation is omitted.

Figure 6:
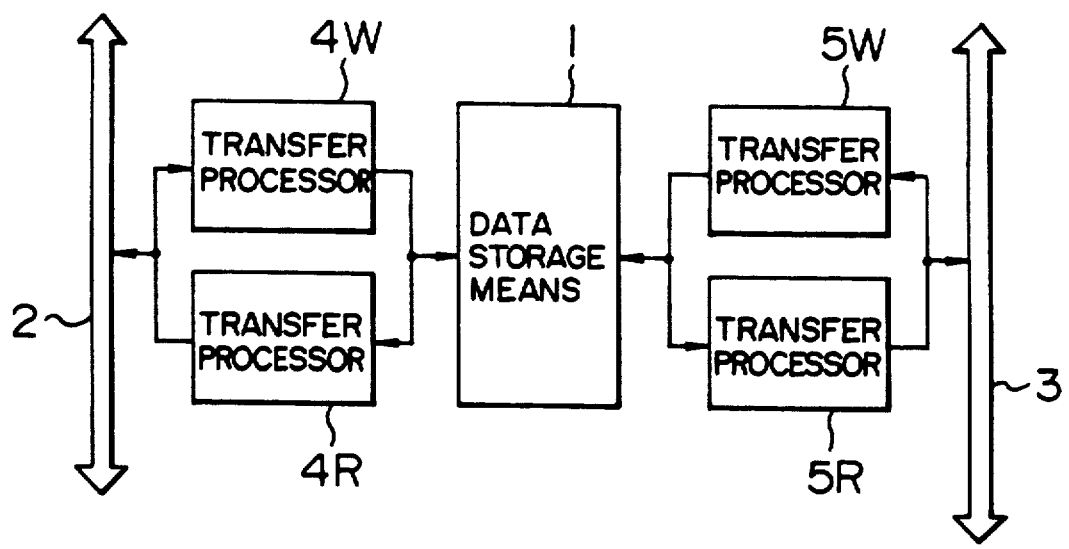

FIG. 6 shows a further embodiment of the present invention. The embodiment of FIG. 6 is different from the embodiment of FIG. 1 in that transfer processors 4W and 5W for writing operation and transfer processors 4R and 5R for reading operation are provided separately from each other.

Figure 7:
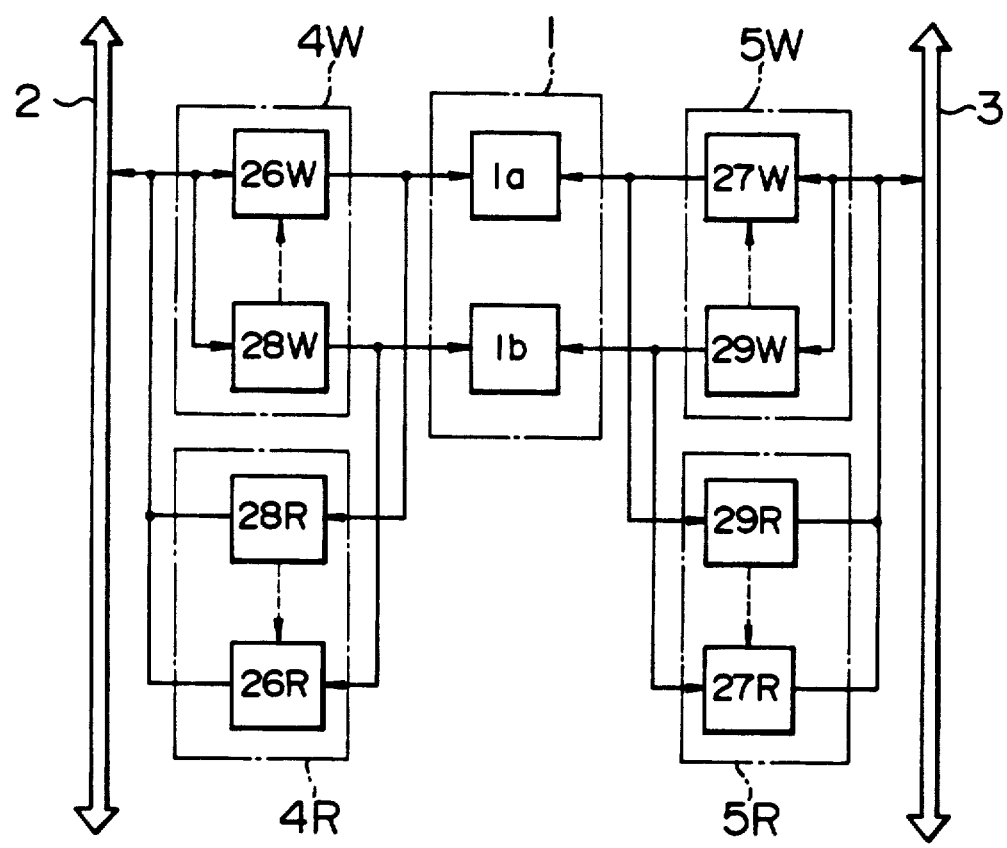

FIG. 7 shows a still further embodiment of the present invention. In FIG. 7, items which are the same as those in FIG. 6 in function as well as in configuration are referenced correspondingly, and description about them will omitted here. The embodiment of FIG. 7 is different from the embodiment of FIG. 6 in that the temporary storage means incorporated in the respective transfer processors 4W, 5W, 4R, and 5R are different in configuration. That is, each of temporary storage means 26W, 26R, 27W, and 27R has a capacity so that (N−1) data blocks of significant length data constituted by N data blocks can be temporarily stored therein and the N-th data blocks stored in the temporary storage means 26W, 26R, 27W, and 27R are then transferred through signal generation means 28W, 28R, 29W, and 29R. Further, the data storage means 1 is divided into two data storage means 1a and 1b according to the data capacity to be processed by the tempotaty storage means 1.

Next, detailed functions and operation of various portions of the embodiment of FIG. 7 will be described hereunder. In this embodiment, a part, for example, (N−1) data blocks, of significant data are temporarily stored, while the final N-th data block is passed through without being temporarily stored. The illustrated embodiment shows the case where N=2.

First, description will be made as to the case where data are written into the data storage means 1 through the transfer processor 4W by way of example. If a write request signal is supplied through a communication bus 2, the first data block of significant length data is temporarily stored in the temporary storage means 26W and the second data block is transferred to the signal generation means 28W. The signal generation means 28W obtains the right of access to the data storage means 1a only upon reception of a data block transferred thereto and gives a write command to the temporary storage means 26W so as to cause the temporary storage means 26W to write the first data block into the data storage means 1a. At the same time, the signal generation means 28W obtains also the right of access to the data storage means 1b to thereby cause the data storage means 1b to storage therein the data block as transferred to the signal generation means 28W.

Next, description will be made as to the case where data are read from the data storage means 1 through the transfer processor 4R by way of example. If a read request signal is supplied through the communication bus 2, the data block stored in the data storage means 1a at the designated address is transferred to the signal generation means 28R and at the same time the data block stored in the data storage means 1b is temporarily stored in the temporaty storage means 26R. Only when the read request signal is applied, the transfer processor 4R obtains the right of access to the data storage means 1a and 1b. The data block transferred to the signal generation means 28R is transferred onto the communication bus 2 as it is, and the data block in the temporaty storage means 26R is transferred onto the communication bus 2 after a predetermined time has elapsed.

According to this embodiment, it is possible to reduce the capacity of the temporary storage means in comparison with the embodiments of FIGS. 1 and 6.

Figure 8:
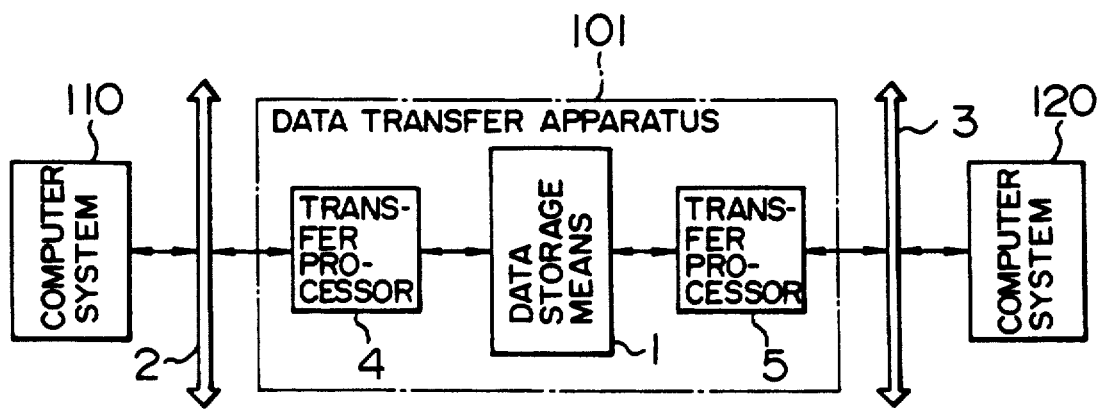
FIGS. 8 and 9 are views showing embodiments of the information processing system using the data transfer apparatus according to the present invention.
Figure 9:
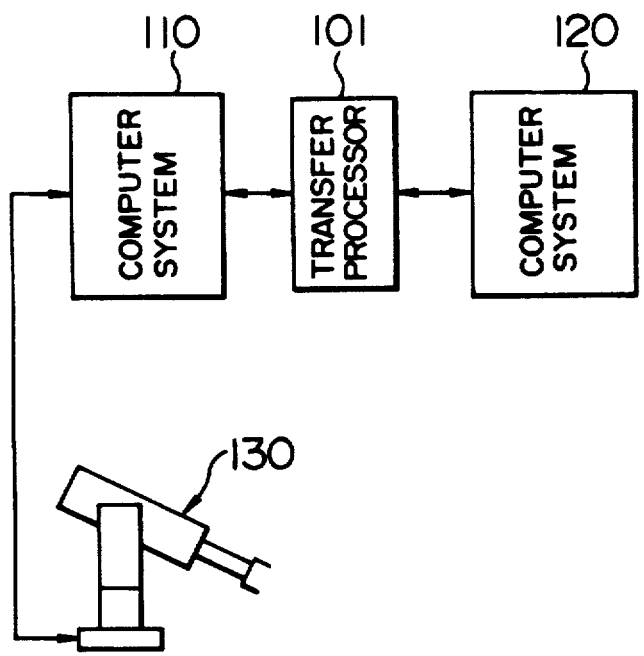

FIG. 8 shows an embodiment of the information processing system using the data transfer apparatus according to the present invention. In the drawing, items having the same functions and configurations as those in the embodiment of FIG. 1 are referenced correspondingly. As seen in FIG. 8, a data transfer apparatus 101 is configured so as to perform data transfer to computer systems 110 and 120 through the two communication buses 2 and 3 respectively in the same manner as in the embodiment of FIG. 1. Further, the computer system 110 may be used as a controller for a robot 130 as shown in FIG. 9, while the computer system 120 may be constituted by a personal computer or a work station.

FIG. 10 shows another embodiment of the information processing system using a plurality of data transfer apparatuses each of which is the same as the foregoing data transfer apparatus 101 according to the present invention. In the drawing, items having the same functions and configurations as those in the embodiment of FIGS. 1 and 8 are referenced correspondingly. The information processing system is constituted by n data transfer apparatuses 101-1, 101-2, . . . , 101-n and communication buses 3-1, 3-2, . . . , 3-n as illustrated in FIG. 10. In this configuration, it is possible to perform data transfer between a single computer system and a plurality of computer systems. Although this embodiment has illustrated the case of performing data transfer between a single system and n systems, it is a matter of course that the invention is applicable to the case of performing data transfer between n systems and n systems, and the case of performing data transfer between n systems and a single system.

According to this embodiment, in communications between personal computers and in communications between two or more computers such as facsimile terminals, VTR terminals, or the like, significant length data can be transferred correctly at a high rate. This embodiment has a further effect that data transfer between computer systems can be easily performed only by inserting the data transfer apparatus according to the present invention between the communication buses of the respective computer systems so that extending property can be provided in data transfer.

Although description has been made only as to the case where uni-directional or bi-dirctional access is made to the data storage means 1 in the foregoing embodiments, access may be made in three or more directions. Further, the present invention is applicable to either case where the significant length of data is fixed or variable.

Although description has been made, by way of example, as to case where data can be written and read into/from the data storage means 1 in all the areas thereof in the foregoing embodiments, the present invention is applicable to the case the write and read areas are limited corresponding to an accessible information processing system.

As described above, according to the present invention, when data transferred through the communication bus are written into the data storage means, a part of or all of the data are temporarily stored so as to make the data in the form of significant length data and the thus formed significant length data are collectively written into the data storage means. When data are read from the data storage means, on the contrary, significant length data stored in the data storage means are collectively read, and a part of or all of the read-out data are temporarily stored and then transferred onto the communication bus. Accordingly, it is possible to make access, at any time, in significant length data, to the data storage means. It is therefore possible to transfer correct data through random access without performing the flag control and the data collating.

Consequently, it is possible to make the rate of data transfer high, to simplify data transfer, and to improve the reliability in data transfer.

We claim:

1. An apparatus for transferring data, of a first data length of n bits, where n is an integer, between at least two systems each connected to a communication bus, each of said communication buses including a first data bus having a capacity of a second data length of n/N bits, where N is an integer, wherein data having the first data length is transferred between the at least two systems through said communication buses and data storage means connected between said communication buses, said apparatus comprising:

plural transfer processing means corresponding to said at least two systems, each transfer processing means being connected between said data storage means and one of said communication buses, for temporarily storing data having the first data length transmitted from one of said at least two system through the one communication bus connected thereto when said data is to be transferred from the one system connected to the one communication bus to the other system of said at least two systems connected to another of said communication buses and for temporarily storing data having the first data length received from the data storage means when said data is to be transferred from the other system to the one system, said each transfer processing means comprises:

temporary storage means having a capacity capable of storing at least (N−1) data blocks of data of the first data length having N data blocks, said temporary storage means being connected to said data storage means through a second data bus having a capacity of the first data length, and temporary storage controlling means connected to said first data bus of the one communication bus and said temporary storage means for controlling transfer of data between the one system and said data storage means wherein, when the data of the first data length is to be transferred from the one system to the other system, at least (N−1) data blocks before a last data block of said data of the first data length received from the one system through the first data bus of the one communication bus are stored in said temporary storage means, and when said last data block is received, said last data block and said (N−1) data blocks which are read out from said temporary storage means, are together as said data of the first data length transmitted through said second data bus to the data storage means for storage therein, and when said data of the first data length is to be transferred from the other system to the one system, N data blocks stored in the data storage means constituting said data of the first data length are together read out of said data storage means, and then sequentially transmitted one block by one block to the one system through said first data bus, while temporarily storing in said temporary storage means at least (N−1) data blocks of said data, which are to be transmitted succeeding to a first one of the N data blocks.

2. An apparatus according to claim 1, wherein the data blocks are stored in the data storage means at areas specified by an address signal which is transmitted through an address bus of the communication bus together with transmission of the data of the first data length.

3. An apparatus according to claim 1, wherein said temporary storage means includes a plurality of first storage means each for temporarily storing at least one data block received from the one system and a plurality of second storage means each for temporarily storing at least one data block of the data read out of the data storage means and said temporary storage controlling means includes first controlling means for controlling said plurality of first storage means and second controlling means for controlling said plurality of second storage means.

* * * * *